(12) United States Patent
Sedeh et al.

(10) Patent No.: US 8,459,354 B2
(45) Date of Patent: Jun. 11, 2013

(54) SELF-SEALING METHOD

(75) Inventors: Mehran Sohrabi Sedeh, Edinburgh (GB); Mahmoud Jamiolahmady, Edinburgh (GB)

(73) Assignee: Heriot-Watt University, Edinburgh (GB)

( * ) Notice: Subject to any disclaimer, the term of this patent is extended or adjusted under 35 U.S.C. 154(b) by 49 days.

(21) Appl. No.: 12/864,451

(22) PCT Filed: Jan. 23, 2009

(86) PCT No.: PCT/GB2009/000234
§ 371 (c)(1),
(2), (4) Date: Nov. 9, 2010

(87) PCT Pub. No.: WO2009/093058
PCT Pub. Date: Jul. 30, 2009

(65) Prior Publication Data
US 2011/0042902 A1  Feb. 24, 2011

(30) Foreign Application Priority Data
Jan. 23, 2008  (GB) .................................. 0801170.2

(51) Int. Cl.
*E21B 33/13* (2006.01)
(52) U.S. Cl.
USPC ............... 166/292; 166/285; 405/53; 405/55; 405/57; 405/263; 405/264
(58) Field of Classification Search
USPC .................. 277/312, 314, 316; 166/292, 285
See application file for complete search history.

(56) References Cited

U.S. PATENT DOCUMENTS

| | | | | |
|---|---|---|---|---|
| 2,885,296 A * | 5/1959 | Welden | ............. | 106/33 |
| 2,991,624 A | 7/1961 | Closs et al. | | |
| 3,144,049 A * | 8/1964 | Ginsburgh | ............. | 138/97 |
| 3,330,352 A | 7/1967 | Bernard | | |
| 3,387,656 A * | 6/1968 | Guest et al. | ............. | 166/288 |
| 3,472,285 A * | 10/1969 | Pennington et al. | ............. | 138/97 |
| 3,727,412 A * | 4/1973 | Marx et al. | ............. | 405/264 |
| 3,947,610 A * | 3/1976 | Bodmer et al. | ............. | 427/142 |
| 4,296,932 A * | 10/1981 | Grobler | ............. | 138/97 |
| 4,582,091 A * | 4/1986 | Ells | ............. | 138/97 |
| 4,973,360 A | 11/1990 | Satas | | |
| 5,562,295 A * | 10/1996 | Wambeke et al. | ............. | 277/605 |
| 6,159,276 A * | 12/2000 | Barks | ............. | 106/33 |
| 6,328,310 B1 * | 12/2001 | Chikaraishi | ............. | 277/314 |
| 7,258,942 B2 * | 8/2007 | Chou et al. | ............. | 429/511 |
| 7,441,596 B2 * | 10/2008 | Wood et al. | ............. | 166/179 |
| 7,713,344 B2 * | 5/2010 | Yoon | ............. | 106/33 |
| 7,749,560 B2 * | 7/2010 | Bell | ............. | 427/140 |
| 7,810,523 B2 * | 10/2010 | McEwan et al. | ............. | 138/97 |
| 8,061,389 B2 * | 11/2011 | McEwan | ............. | 138/98 |
| 2003/0056370 A1 * | 3/2003 | Wild | ............. | 29/890.14 |
| 2008/0148819 A1 * | 6/2008 | Sasaki et al. | ............. | 73/40.7 |
| 2009/0174148 A1 * | 7/2009 | Bischof et al. | ............. | 277/316 |
| 2010/0127460 A1 * | 5/2010 | Bennett | ............. | 277/313 |
| 2011/0024988 A1 * | 2/2011 | Ryan et al. | ............. | 277/316 |
| 2011/0121516 A1 * | 5/2011 | Hallundaek | ............. | 277/316 |
| 2011/0221137 A1 * | 9/2011 | Obi et al. | ............. | 277/316 |

OTHER PUBLICATIONS

International Search Report for PCT/GB2009/000234 dated Jun. 5, 2009.

* cited by examiner

*Primary Examiner* — Thomas Beach
*Assistant Examiner* — Eugene G Byrd
(74) *Attorney, Agent, or Firm* — W. Kevin Ransom; Moore & Van Allen, PLLC

(57) ABSTRACT

A method of sealing a leak of fluid from a container comprises introducing a solute to a body of fluid within the container. The solute is selected so as to be soluble in the fluid at the expected conditions prevailing inside the container, and insoluble when the pressure experienced by the fluid is reduced at the site of a leak.

10 Claims, 2 Drawing Sheets

SELF-SEALING METHOD

FIELD OF THE INVENTION

The present invention relates methods for sealing a leak of fluid from containers such as storage reservoirs. It is particularly suitable for sealing leaks of supercritical fluids from geological reservoirs and formations.

BACKGROUND TO THE INVENTION

The present invention is a method which enables leaks, both known and unknown, from containers such as storage reservoirs, particularly geological reservoirs and formations, to be automatically diagnosed and sealed without the need for external intervention.

Therefore the present invention can be applied to diagnose and seal carbon dioxide ($CO_2$) leakage from geological reservoirs, including both hydrocarbon reservoirs and aquifers, and is therefore of particular applicability to the environmental, petroleum engineering and $CO_2$ storage fields.

The leakage of a fluid from containers is of major concern in many industries on account of the economic losses, environmental damage and hazard to health and safety that can result. Where storage of large quantities of a hazardous fluid is contemplated the potential loss or harm caused is increased.

It is therefore desirable to have methods for detecting leakage and for sealing any leaks that may occur. This is particularly the case when the container is difficult to access for inspection or is simply too large for constant or even periodic monitoring, for example an underground geological formation.

$CO_2$ capture and sequestration (storage) by various techniques is proposed as a means of reducing the quantity of this gas in the atmosphere, in order to combat global warming. Forming a major part of current $CO_2$ mitigation strategies is the safe storage of large volumes of $CO_2$ over long periods through its injection into and storage in subsurface reservoirs, or "geological sequestration".

Appropriate geologic targets for $CO_2$ sequestration are generally brine-bearing formations (those containing nonpotable waters), and mature or abandoned oil and gas reservoirs.

However there are major concerns with respect to the integrity of seal in these geological subsurface reservoirs, and consequently the potential leakage of injected $CO_2$ from the reservoir into which it is injected, into neighbouring permeable formations, or into the atmosphere.

Such leakage is a concern for many reasons, but chiefly because it may contaminate existing energy, mineral, and/or groundwater resources, pose a hazard at the ground surface, and will contribute to increased concentrations of $CO_2$ in the atmosphere.

The diagnosis and sealing of storage reservoir leakage, particularly $CO_2$ leakage from geological reservoirs, is of major concern to many industries and governments and also to the public.

Even small but continued leakage is undesirable, as it would result in return of the gas to the atmosphere, defeating the object of storage. Similar considerations apply where bulk quantities of other fluids are stored.

The two main potential leakage pathways for geologically stored $CO_2$ are, first, leakage of injected $CO_2$ through natural pathways such as faults and fractures (known and unknown) in a geological formation, and second, leakage through improperly cemented existing or abandoned wells.

In practice, identifying these potential leakage locations and executing effective remedies presents a huge problem for those engaged in geological sequestration and storage of $CO_2$.

In geological sequestration of $CO_2$, caprock can provide a low permeability and capillary barrier that can prevent upwards migration of $CO_2$. In some cases, however, it is possible that there are undetected faults, fractures or sand streaks within the caprock, or that the $CO_2$ spreads outside the intended storage formation and thus round the caprock. If the $CO_2$ plume encounters a permeable fault or fracture, or permeates round the caprock, it may leak towards the surface.

Another potential leakage scenario applies to wells, typically oil or gas wells, both existing and abandoned. Possible leakage pathways within an existing well can include preferential flow pathways along the rock-cement interface, along the casing-cement interface, and through degraded materials.

Also, while intact well cements have very low permeability (of the order of 10-20 $m^2/10^{-5}$ milliDarcy), and hence are good materials to use in well completions, the overall permeability of well materials as a whole is very sensitive to relatively small changes in its configuration.

For example, a thin, say 1 millimeter, degraded zone of cement, with very large permeability in the degraded zone, or an annulus associated with poor bonding of cement to rock or casing, can lead to large effective permeability if the annular opening is continuous along the well.

The extreme sensitivity of permeability values to small-scale irregularities, coupled with the large number of wells that typically exist in mature hydrocarbon reservoirs, gives a high leakage potential from well-based $CO_2$ sequestration.

Four basic approaches have been suggested for stopping $CO_2$ leakage from reservoirs:

(1) Reducing the pressure in the storage reservoir. However, this is not a straightforward task, and would involve the removal of $CO_2$ from the reservoir, consequently creating $CO_2$ disposal challenges, and negating the original aims of geological sequestration.

(2) Interception and extraction of the $CO_2$ plume from the reservoir before it leaks out of the storage structure. However, this requires accurate information on the location of the plume, and also the use of techniques and facilities to extract the plume. Again disposal challenges are faced, negating the original aims of geological sequestration.

(3) In case of $CO_2$ leakage into another rock formation, inducing greater pressure in the rock formation into which leakage is occurring. However, this is a complicated exercise, as it requires information on the specific target area, amount and type of fluid and an accurate monitoring program.

(4) In case of leakages with known and accessible locations, for example within wells, plugging the leak with low permeability materials, for example cement, thereby stopping leakage out of the storage formation. However, this also requires accurate information on the type and amount of material to be used, as well as on the specific target area.

As all of the current leak prevention methods described above require, in the first place, information on the type, extent and location of the leak prior to implementing any of the corresponding remedial work, an analysis of potential leakage of injected $CO_2$ from a formation, as well as an evaluation of the feasibility of the proposed prevention method, is generally required.

In this analysis the preferential flow paths for the leakage of injected $CO_2$ through natural pathways, such as faults and fractures, and/or through improperly abandoned or cemented wells should be identified. A realistic geological picture may be required. This comes with a great degree of uncertainty, making the task of identifying the leak target area very difficult, if not impossible. An accurate and extensive monitoring program may also be required to detect the existing preferential leakage flow path and/or detect the extent of degrading. Both of these items require sophisticated and specifically designed equipment, set-ups and procedures. There is also a large delay time from between when a leak occurs, when it is detected, and the point by which a sealing mechanism (if at all possible) can be put in place once the target area has been located accurately enough.

The present invention includes a unique method for effectively stopping $CO_2$ leakage pathways from geological storages when and where they happen.

DESCRIPTION OF THE INVENTION

The present invention provides a method of sealing a leak of fluid from a container, the method comprising: introducing a solute to a body of fluid within the container; wherein the solute is selected so as to be soluble in the fluid at the expected conditions prevailing inside the container, and insoluble when the pressure and/or temperature experienced by the fluid is reduced at the site of a leak, whereby the solute comes out of solution and seals the leak.

The solute precipitates or crystallises out of the fluid at the site of the leak forming a sealing blockage, which prevents or at least reduces continuation of the loss of fluid.

The fluid may comprise a substance in a supercritical fluid state. The substance in a supercritical fluid state may be carbon dioxide ($CO_2$) or a mixture comprising predominantly $CO_2$. Such a $CO_2$-rich mixture may be derived from a combustion process and might include flue gas, nitrogen, sulphur, oxygen, nitrogen oxide, argon and various other gases and impurities. The method of the invention may be employed with other fluids and supercritical fluids, with the solute selected to suit the fluid and the conditions of its storage. The container may be any type of container employed to hold a quantity of a fluid under pressure relative to the conditions prevailing at the exterior of the container. Suitable natural containers such as porous geological formations that normally contain brine, oil or gas are the prime target of the method of this invention when the fluid is supercritical $CO_2$.

The method of the present invention finds particular use in storage of a substance in the supercritical fluid state in a geological formation. Substances in their supercritical state can show substantial solubility for a solute that is not so soluble in other phases, such as a gas phase. Such a change in solubility which will occur with dropping pressure at the site of a leak allows the solute to precipitate or crystallise, leading to sealing off of the leak.

A suitable choice of solute for a given fluid can be made from known solubility in the fluid at the expected temperature and pressure within the container and outside the container. Simple tests can be employed to ascertain solubilities at given pressures and temperatures, if not already known, and the applicability of the method confirmed by leakage simulation in model systems as described hereafter.

The present invention is a method whereby leakages from storage reservoirs and devices, particularly geological storage reservoirs containing supercritical $CO_2$ (or a $CO_2$-rich mixture) such as hydrocarbon reservoirs or aquifers, are automatically detected and sealed without the need for intervention.

The leak sealing process takes place in-situ without the need for identifying the precise or general location of the leak. This is an advantage where a geological formation is employed as the container is large and leakage can occur anywhere over an extensive area.

The applicability of the method for use with supercritical fluids can be understood by consideration of the properties of such fluids. Under the influence of pressure (P) and temperature (T), pure substances can assume a gas, liquid, or solid state of matter, as illustrated in FIG. 1.

The critical point (C) of a pure substance represents the maximum temperature and pressure in which the liquid and vapour phases of the substance coexist in equilibrium.

Following this point (C), at higher temperatures and pressures the gas and liquid phases have the same density and appear as a single phase.

A substance is said to be supercritical when it is above its critical point, meaning more fully when its temperature and pressure are in a state above its critical temperature (Tc) and critical pressure (Pc). Table 1 below shows critical pressure and critical temperature of selected substances.

TABLE 1

| Element | Critical temperature (° C.) | Critical pressure (atm) |
|---|---|---|
| Ammonia ($NH_3$) | 132 | 115 |
| Carbon dioxide ($CO_2$) | 31.2 | 77 |
| Carbon monoxide (CO) | −141 | 35.9 |
| Ethanol ($C_2H_6O$) | 216 | 65 |
| Methane ($CH_4$) | −82 | 45.8 |
| Propane ($C_3H_8$) | 97 | 42 |
| Sulfur dioxide ($SO_2$) | 157 | 77.8 |
| Water ($H_2O$) | 374 | 217.8 |

The most important properties of supercritical substances are their large liquid-like density, large compressibility, and viscosity, which is intermediate between the gas and liquid extremes.

Density is the true measure of a supercritical substance's solvent power, and a large, generally liquid-like, density gives a greater solvent power.

Large compressibility gives rise to a significant capacity for the variation of density, and thus solvent power, between gas- and liquid-like extremes with small changes of pressure.

Small changes in pressure can therefore result in large changes in solubility. Change to a lower pressure can mean a decrease in solubility, whilst a higher pressure can mean a greater degree of solubility.

As an example, the solubility of naphthalene in supercritical carbon dioxide is illustrated in FIG. 2.

As one would expect, at low pressure, where the $CO_2$ is in its gaseous state, its solubility is essentially nil.

As the pressure is increased to above the critical point pressure of carbon dioxide (which is 73 atm), its solubility rises.

With regard to many compounds, an example of which is naphthalene, the rise is often quite dramatic, as illustrated in FIG. 2. For example, at 200 atm and 45° C., the solubility is 7%.

The present invention provides a method whereby solid or highly viscous solutes are dissolved into a substance, preferably a gas when under ambient (surface) pressure and temperature conditions. The gas is stored in a porous medium, preferably a geological reservoir or formation, when that substance is in its supercritical state, and thus has a high degree of solubility for the solute.

The preferable amount of solute that should be dissolved is a function of many parameters, including type of solute, solvent (supercritical fluid) and pressure and temperature of the storage reservoir. The preferable amount should therefore be determined on a case by case basis, preferably by reference to experimental fluid/solute sample testing.

The substance is stored in the reservoir under conditions which maintain it in a supercritical state.

If a leak then occurs, at the site of the leak, the substance experiences a pressure decrease.

This pressure decrease causes a consequent substantial decrease in the solubility of the substance at the site of the leak and along the leakage flow path.

Due to this decrease in solubility, precipitation or crystallisation of the solid or highly viscous solute, originally dissolved in the substance in its supercritical state, occurs at the site of the leak and along the leakage flow path. The greater the decrease experienced in the pressure, the greater the degree of precipitation or crystallisation occurring.

As leakage continues, further amounts of the supercritical substance are drawn towards the leak, allowing for further and greater precipitation or crystallisation at the site of the leak and along the leakage flow path.

As this precipitation continues, a solid or viscous fluid blockage builds up at the site of the leak and along the leakage flow path (where the pressure has decreased).

As this blockage continues to grow, the leakage flow path becomes narrower until the leak is blocked.

The leak is then and therefore consequently sealed without the need for intervention, because of the prior dissolving of solid or viscous solutes in the substance whilst in its supercritical state, and their precipitation or crystallisation as a consequence of pressure decrease.

By this the present invention can be said to be "self-diagnosing" and "self-sealing".

In a further aspect of the present invention, the above method can be modified to counteract leaks, which have already developed within storage devices or containers, particularly geological reservoirs, which are already in use.

In this case, solid or highly viscous solutes should preferably be dissolved in a body of the same fluid as is being stored in the container. For example, if a supercritical fluid is stored then a supercritical body of the same substance (for example, $CO_2$) as is held within the container is used to dissolve the solute.

This body of the fluid (e.g. supercritical substance) containing the solute should then be injected into the container, for example a geological formation being used as a reservoir, preferably at or near the location of the leak, although this is not crucial to the success of this aspect of the present invention.

Following injection, the leak will then proceed to become blocked following the process outlined in the above description of the present invention.

Alternatively, in some circumstances it may be appropriate to dissolve the solute in a solvent that is different from but compatible with the fluid being stored in the container. This can be advantageous, for example if the solute is highly soluble in the solvent and this allows a high concentration of the solute to be easily introduced near the site of a leak.

Solid solutes utilized as part of the present invention should preferably be stable, both at the pressure and temperature conditions found in the container (for example the conditions necessary to maintain the substance within its supercritical state), and those outside the storage container (for example the seabed in the case of a geological reservoir), otherwise they may not precipitate or crystallise and provide a stable seal at the site of the leak when pressure or temperature decreases.

In general, any solutes that can be dissolved in fluids or supercritical fluids can be utilized within the present invention, so long as they precipitate preferably as a solid or a high-viscosity substance when the pressure of the fluid or supercritical fluid drops or the temperature changes sufficiently. Many natural or synthetic solutes can be used as part of this invention. Examples of the wide range of solutes that can dissolve in supercritical $CO_2$ include but are not limited to caffeine, carotene, carbon black and capsaicin.

The solutes should also preferably be environmentally benign.

The melting point of the solid solutes should be above the storage container temperature.

The critical point of $CO_2$ is where the pressure (Pc) is 73.8 atm, and the temperature (Tc) is 31.1° C. However in a typical geological formation such as those proposed for $CO_2$ sequestration the conditions may be expected to range in temperature from 30-150° C. Similarly the pressure may range from 70-350 atm. Therefore a suitable solute for supercritical $CO_2$ storage especially in geological formations must be compatible with these storage conditions.

Suitable solutes for these conditions include but are not limited to hydrocarbons with a suitably high melting point. For example naphthalene has been shown to be effective in tests modelling a leakage from a container of supercritical $CO_2$ as described below.

Other potential solutes include but not limited to fluorenone, guar gum, 3-hydroxy-4-methoxybenzoic acid, 3-methoxybenzoic acid, 4-methoxybenzoic acid, molybdenumhexacarbonyl, 2,3,4,5-tetrachlorophenol, and vanillin.

Alternatively polymeric solutes may be employed for example a fluoropolymer.

BENEFITS OF THE PRESENT INVENTION

The simplicity of the present invention makes its application practically attractive, as it does not require any specifically designed and complicated equipment, set-ups and procedures.

Furthermore, the sealing process is activated automatically as soon as a leak occurs.

In the long term, a leak proof reservoir could experience leaks due to both man-made (well cement failure) and natural events like earthquakes, tectonic and geological changes in the structure of the reservoir. The present invention offers a safety means to safeguard against these unforeseen future leaks.

In short, the present invention offers a unique method for preventing leakage, especially stopping $CO_2$ and $CO_2$-rich mixtures leakage from subsurface geological reservoirs. It offers benefits in the form of the lack of a requirement for detecting the location of leaks before they can be stopped, the provision of an automatic in-situ sealing mechanism, the lack of a need for any particular equipment and set-up, and the absence of a delay time between when a leakage occurs to when the sealing process begins.

For some $CO_2$ leakage problems, the present invention offers the only solution ever presented. Its application is simple, effective and fast.

DESCRIPTION OF SOME PREFERRED EMBODIMENTS AND EXPERIMENTAL RESULTS

The present invention includes a method for the automatic detection and sealing of $CO_2$ leakages from geological storage reservoirs (including hydrocarbon reservoirs, depleted or abandoned hydrocarbon reservoirs and aquifers), from both known and unknown leakage paths.

The sealing process takes place in-situ at the location of the leak without the need for identifying the leak target area.

Information on the type, extent and location of the leaks, vital in implementing the remedial measures described in the background to the present invention, is not necessary for performance of this aspect of the present invention.

The critical point of $CO_2$ is Pc=73.8 atm, and Tc=31.1 C.

The pressure and temperature conditions within reservoirs used for the geological storage of $CO_2$ are normally above these values, and thus above the critical point of $CO_2$.

For instance the temperature and pressure of a typical North Sea oil reservoir is 80° C. and 300 atm respectively.

Hence, in geological sequestration and storage reservoirs, $CO_2$ is generally stored as a supercritical fluid.

One of the options available for geological storage and sequestration of $CO_2$ is abandoned hydrocarbon (oil or gas) reservoirs.

As described above, abandoned oil and gas reservoirs can have leaky caprock or wells. Leakage through the caprock can be due to narrow sand streaks, fissures or fractures within the caprock. Leakage through wells can be due to imperfect or degraded cement behind the well casing.

At supercritical conditions, $CO_2$ has an excellent solvent properties and can dissolve a wide range of materials.

Figure 1:
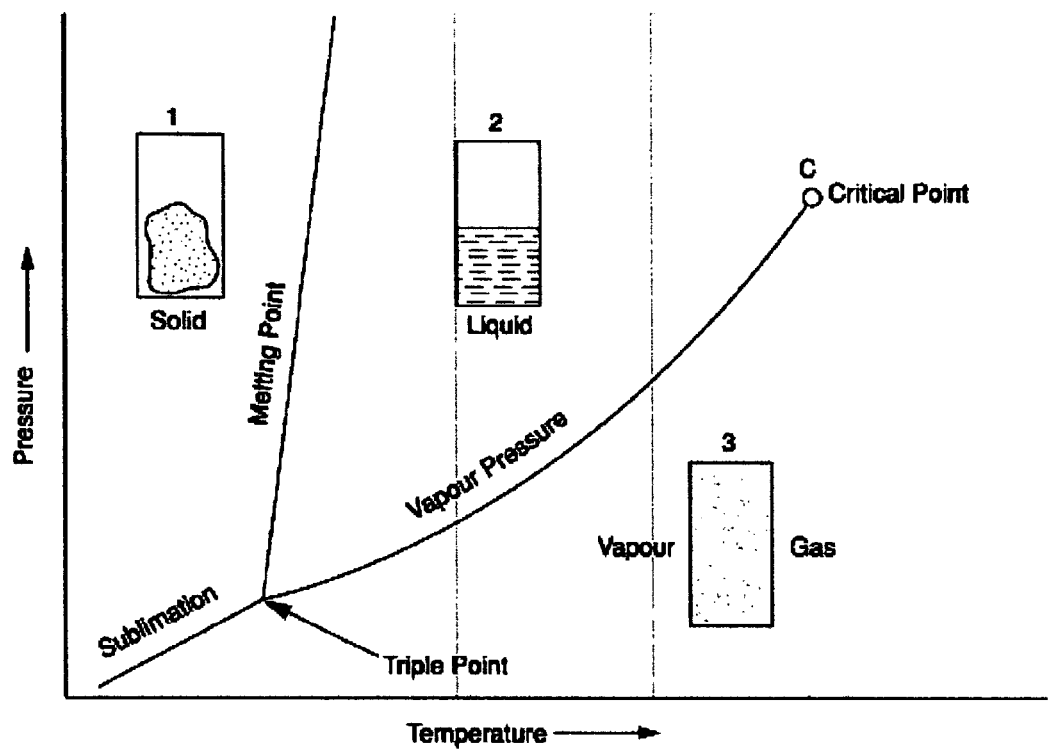
FIG. 1 is an illustrative pressure-temperature phase diagram for a pure substance.
Figure 2:
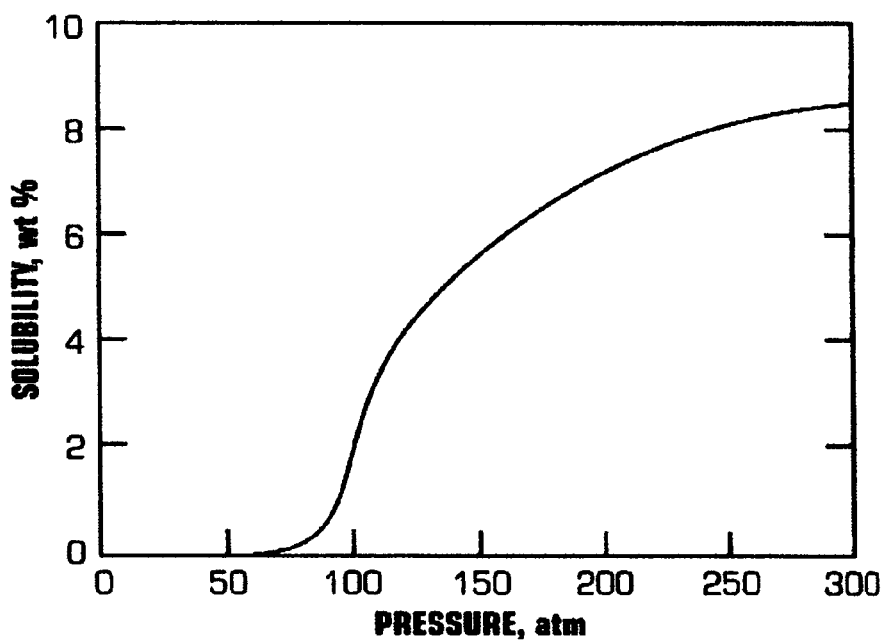
FIG. 2 shows the solubility of naphthalene in carbon dioxide.

However, as shown in FIG. 2, the high solvent power of supercritical $CO_2$ drops sharply, and for majority of solutes to almost zero, when its pressure falls below its critical point.

Taking advantage of the abrupt change in solvent power of $CO_2$ in the vicinity of its critical point, the present invention offers a unique method of stopping $CO_2$ leakage from geological reservoirs.

This part of the present invention is implemented by dissolving solid or viscous solutes into supercritical $CO_2$ prior to injection into the reservoir. The supercritical $CO_2$ is then injected into the subsurface geological reservoir.

When a leak occurs, the pressure drops at the site of the leak, and consequently so does the solvent power of the $CO_2$.

As $CO_2$ leakage begins and continues, $CO_2$ will be drawn towards the location of the leak due to the pressure difference imposed by the leak. By this the present invention can be said to be "self-diagnosing". Leaks are "automatically located" and hence sealed because of the pressure change.

As the $CO_2$ moves out in the leakage flow path, pressure drops and the solid or viscous solute precipitates or crystallises out of the $CO_2$ blocking the leak where the pressure drop is taking place. The same mechanism happens in case of leaky wells. By this the present invention can be said to be "self-sealing".

Continuing precipitation or crystallisation of the solutes causes blockage of the leakage paths and eventually completely plugs the leak.

In another aspect of the present invention, and with regard to reservoirs which already contain $CO_2$ and which are experiencing unforeseen leaks, solid or viscous solutes can be added to a batch of supercritical $CO_2$ and injected in the reservoir, preferably in the region of the leaking area. As this solute-charged $CO_2$ batch is drawn into the preferred leakage flow path, precipitation of solid particles takes place resulting in the sealing of the leakage path and subsequent prevention of further $CO_2$ leakage.

The solute should preferably have the ability to form solid particles or a very viscous fluid at reservoir temperature and pressure conditions, meaning that its melting point should be above the reservoir temperature. For an effective long lasting leak prevention, the solute should be stable at reservoir conditions over long period of time. There are a wide range of materials, both natural and synthetic, that are soluble in supercritical $CO_2$, and which would form solid crystals or particles when they precipitate as the $CO_2$ pressure drops, of which naphthalene is one example.

Tests have been carried out using a container of supercritical $CO_2$ connectable to pipes of varying diameter. The pipes represent a leak path of a defined size. When the pipe is connected to the container leakage occurs with the consequent loss of pressure. The loss of pressure results in a change of solubility of solutes dissolved in the $CO_2$. If the solute precipitates out in sufficient quantity the leakage can be "automatically" sealed.

Figure 3:
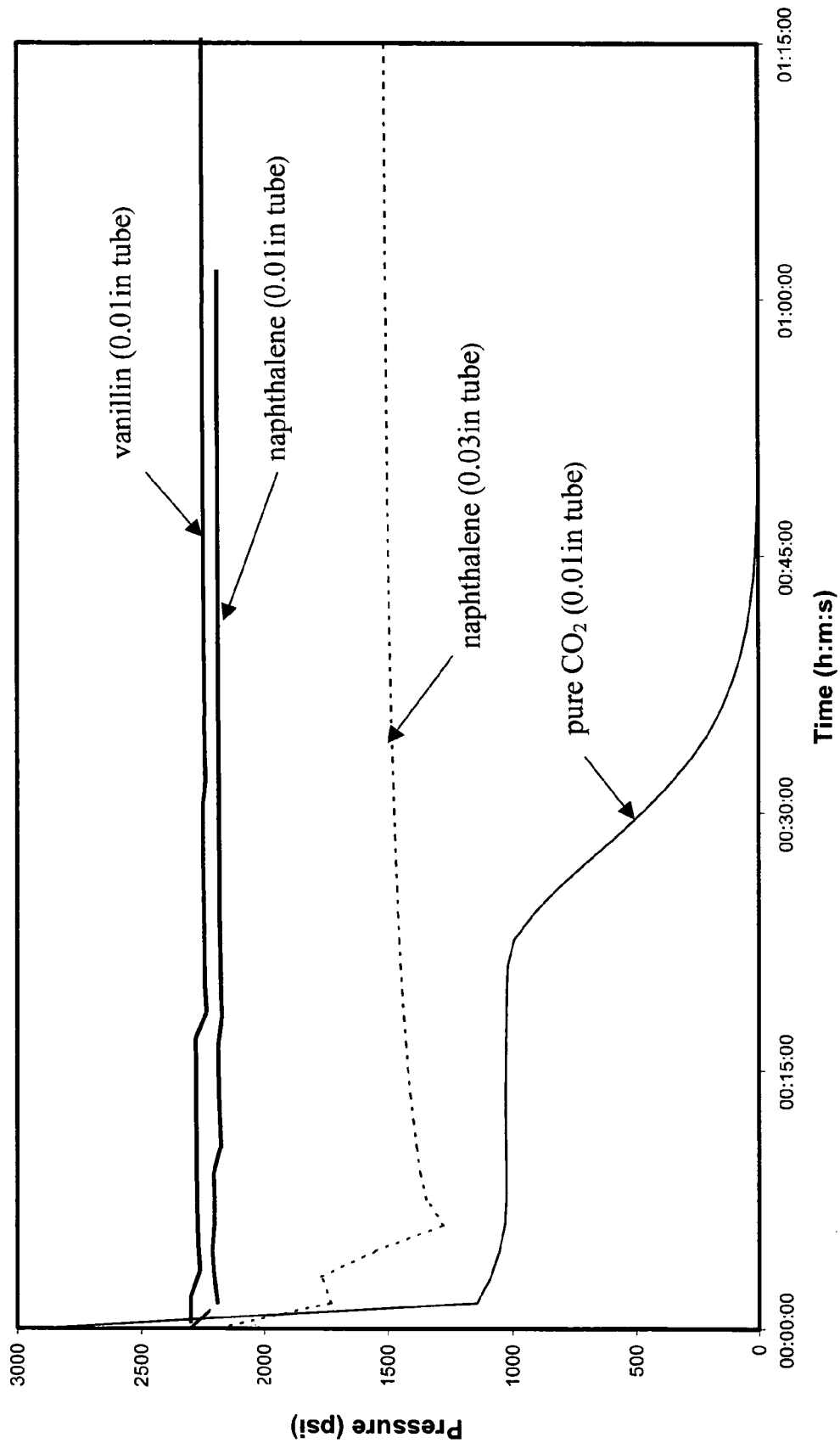
FIG. 3 shows graphically the results of experiments in sealing leakage of carbon dioxide.

Results are illustrated in FIG. 3, which shows graphically the change in pressure, above atmospheric, over time found for a supercritical $CO_2$ container following connection to pipes, leading to atmosphere, of different diameters. These tests were carried out at 38° C. with a solute concentration of 7%.

As can be seen from the graph of FIG. 3, when no solute was present and the container was opened to a 0.01 in diameter pipe there was a rapid initial drop in pressure, followed by a plateau at about 1000 psi during which the contents of the container were lost steadily to atmosphere through the pipe. Finally as the supply of $CO_2$ becomes exhausted the pressure drops to zero (atmospheric).

In contrast where vanillin or naphthalene is present as a solute after a small initial drop there is little or no drop in pressure over time when connected to a 0.01 in diameter tube. These solutes precipitate from the $CO_2$ rapidly sealing the leakage from the pipe.

The effectiveness of the hydrocarbon naphthalene is further demonstrated where a much wider 0.03 in diameter pipe is used as the model leak. After an initial drop in pressure to around 1500 psi the pressure remains steady showing that the leak has been sealed. The remaining contents of the reservoir are prevented from escape by the precipitation of the naphthalene at the leak site.

The invention claimed is:

1. A method of sealing a leak of fluid from a container comprising a geological formation or reservoir having a temperature therein of from 30 to 150 ° C. and a pressure therein of from 70 to 350 atm, the method comprising: introducing a solid solute into a body of fluid within the geological formation or reservoir; wherein the body of fluid is supercritical $CO_2$ or a supercritical mixture comprising predominantly $CO_2$ and the solid solute is selected so as to be soluble in the body of fluid inside the geological formation or reservoir, and insoluble when the pressure experienced by the body of fluid is reduced at the site of a leak, whereby the solid solute comes out of solution and seals the leak.

2. The method according to claim 1 wherein the solid solute is dissolved in the body of fluid before the body of fluid is introduced into the container.

3. The method according to claim 1 wherein the solid solute is dissolved in a second body of the same fluid as is already being stored in the geological formation or reservoir and the second body of fluid containing the solute is introduced into the geological formation or reservoir following detection of a leak.

4. The method according to claim 1 wherein the solid solute is dissolved in a body of a different fluid to that already being stored in the geological formation or reservoir and the body of different fluid containing the solid solute is introduced into the geological formation or reservoir following detection of a leak.

5. The method according to claim 1 wherein the solid solute is a hydrocarbon.

6. The method according to claim 1 wherein the solid solute is selected from the group consisting of naphthalene, fluorenone, guar gum, 3-hydroxy-4-methoxybenzoic acid, 3-methoxybenzoic acid, 4-methoxybenzoic acid, molybdenumhexacarbonyl, 2,3,4,5-tetrachlorophenol, and vanillin.

7. The method according to claim 1 wherein the solid solute is a polymer.

8. The method according to claim 7 wherein the solid solute is a fluoropolymer.

9. The method according to claim 1 wherein the body of fluid is a supercritical mixture comprising predominantly $CO_2$ that is derived from a combustion process.

10. The method according to claim 1 wherein the geological formation or reservoir is a porous geological formation.

\* \* \* \* \*